United States Patent [19]

Spiegel et al.

[11] Patent Number: 5,159,760
[45] Date of Patent: Nov. 3, 1992

[54] DEVICE FOR ALIGNING A GEODETIC INSTRUMENT OVER A DEFINED POSITION MARK

[75] Inventors: Armin Spiegel, Berneck, Switzerland; Wolfgang Rebhandl, Dornbirn, Austria

[73] Assignee: Leica Heerbrugg AG, Heerbrugg, Switzerland

[21] Appl. No.: 665,795

[22] Filed: Mar. 8, 1991

[30] Foreign Application Priority Data

Mar. 8, 1990 [DE] Fed. Rep. of Germany ....... 4007245

[51] Int. Cl.⁵ .............................................. G01B 3/02
[52] U.S. Cl. ...................................... 33/227; 33/250; 33/299; 33/292; 33/228
[58] Field of Search ................ 33/227, DIG. 21, 284, 33/285, 290, 292, 299; 356/250, 149

[56] References Cited

U.S. PATENT DOCUMENTS

| | | | |
|---|---|---|---|
| 3,471,234 | 10/1969 | Studebaker | 33/285 X |
| 4,171,907 | 10/1979 | Hill et al. | 33/284 X |
| 4,183,667 | 1/1980 | Denton | 356/250 |
| 4,888,881 | 12/1989 | Dudley | 33/770 X |

FOREIGN PATENT DOCUMENTS 3838512  1/1990  Fed. Rep. of Germany .

*Primary Examiner*—Harry N. Haroian
*Attorney, Agent, or Firm*—Foley & Lardner

[57] ABSTRACT

A device for centering geodetic instruments over defined ground marks or defined position marks is described, in which a visible light beam is projected onto a ground mark or position mark. In an advantageous additional feature, the light beam of the invention can be used to measure the distance between the sighting line of the geodetic instrument and the sighted ground mark or position mark.

7 Claims, 2 Drawing Sheets

DEVICE FOR ALIGNING A GEODETIC INSTRUMENT OVER A DEFINED POSITION MARK

BACKGROUND OF THE INVENTION

The invention relates to a device for centering a geodetic instrument over a defined position mark or ground mark, having an optical sighting component arranged centrally with respect to the vertical axis of the instrument, wherein the sighting component has means for generating a visible, collimated light beam onto a ground mark or defined mark lying in the extension of the vertical axis of the instrument.

Such devices are known for geodetic instruments and are used for positioning the instrument over a ground mark, for example over a boundary stone or a position mark in a building or other structure.

A laser-theodolite in which the laser is mounted so as to be rotatable about its vertical axis and its horizontal axis is known from German Patent Specification 3,838,512. The tripod carrying the theodolite has a tribrach with a central through-clearance or aperture, through which the measuring laser can be directed at a nadir point to be determined.

The tribrach includes an automatically operating self-leveling device with electronically cooperating bubble levels.

The device described in this specification is technically highly complex and can be used only in the case of laser measuring instruments. No application possibilities above and beyond this, for example in the case of sighting targets, reflectors or the like, are possible. Conventional measuring instruments with a telescope can neither be operated nor retrofitted with this device.

In the case of other devices which have become known to date, plumb bobs or plumbing rods are used. An improvement in the positioning accuracy has been achieved by the use of an optical plummet or optical plumb bob. Such an optical plummet is arranged in the vertical axis, about which the entire instrument can be rotated, and contains an optical telescope, an eyepiece and a built-in graticule for centering the instrument over a ground mark or position mark. In use, the mark is observed with this instrument while the entire instrument is displaced over the mark until the ground mark appears in the graticule of the telescope.

These known devices have proved successful with regard to their accuracy.

Practice has shown, however, that the eyepiece arranged on the instrument is ergonomically disadvantageous. For instance, the operator must adopt a stooped position in order to continuously observe the ground mark while simultaneously displacing the instrument over the ground mark.

More recent geodetic instruments with laser measuring beams or known self-illuminating sighting marks have made it possible to carry out measurements at night or in conditions of poor light. To be able to perform an exact positioning of the instrument likewise under such conditions (in contrast to "day time measurements" or those performed in adequate light) it is necessary to illuminate the ground mark. Moreover, it is also necessary for various geodetic instruments to determine the exact distance between the ground mark and the sighting line of the geodetic instrument. Until now, this distance measurement has been carried out with conventional tape measures or divided rules and has required an additional working step.

The present invention simplifies the centering operation of a geodetic instrument of any type over a defined ground mark or position mark while simultaneously insuring ergonomically easy handling even under impeded operating conditions such as darkness or low light.

Advantageous further developments are the simplification of the distance measurement between a ground mark or position mark and the sighting line of the instrument.

SUMMARY OF THE INVENTION

It is an object of the present invention to simplify the centering operation of a geodetic instrument of any type over a defined mark while simultaneously insuring ergonomically easy handling.

It is also an object of the present invention to enable simplified operation of geodetic instruments even under impeded operating conditions such as darkness or low light.

It is a further object of the present invention to provide means for quickly and accurately measuring the distance between a geodetic instrument sight line and a defined mark.

It is an additional object of the present invention to provide means for automatically and accurately indicating, recording and transmitting such measurement data.

Furthermore, it is an object of the present invention to provide means for use of the invention with any geodetic instrument.

It is also an object of the invention to provide a method for simplifying the centering, measuring and collimating operations of geodetic instruments of any type in relation to a defined mark while simultaneously insuring ergonomically easy handling even under impeded operating conditions such as low light or darkness.

In accordance with the objectives of the invention, a device for centering a geodetic instrument over a defined mark is provided. The device has an optical sighting unit arranged centrally with respect to a vertical axis of the instrument, means for generating a visible, collimated laser beam, and means for projecting the beam onto a mark so that such mark lies in the extension of the vertical axis of the geodetic instrument.

The invention is also provided with a light-emitting unit, disposed to be rotatable together with the instrument about the vertical axis of the instrument and a sighting device mounted upon a tribrach.

Furthermore, the invention is provided with a distance measuring device for determining the distance between the defined mark and the sighting line of the geodetic instrument. The distance measuring device may be means for modulating the light beam and for analyzing the light reflected from the defined mark to determine the distance between the mark and the sighting line of the geodetic instrument. An interface is also provided for transmitting data to a central data acquisition unit.

Further objects, features and advantages of the present invention will become apparent from the detailed description of preferred embodiments appearing below.

BRIEF DESCRIPTION OF THE DRAWINGS

The invention is explained in further detail in two illustrative embodiments with reference to the figures of drawings.

DETAILED DESCRIPTION OF THE PREFERRED EMBODIMENTS

Figure 1:
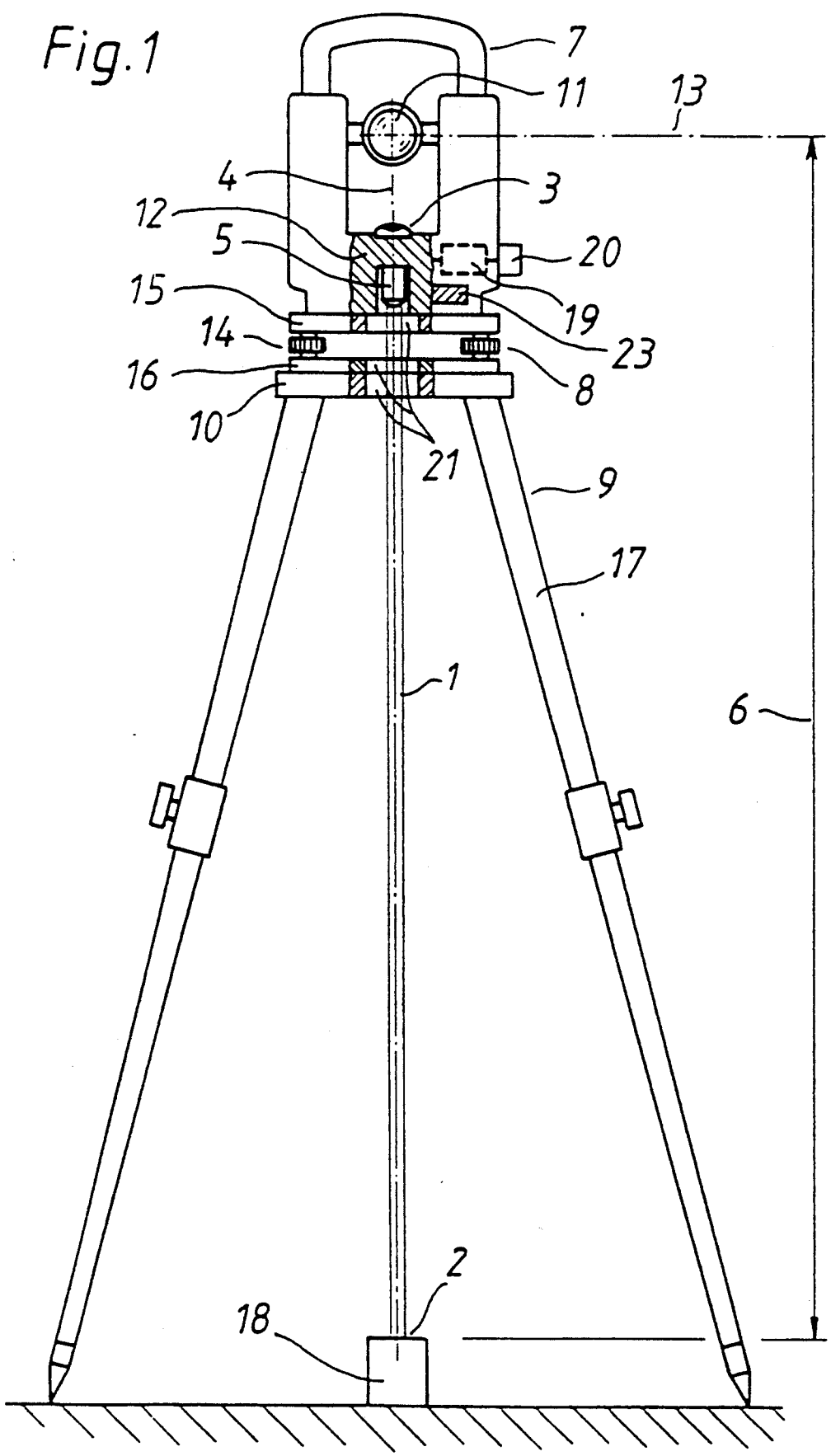
FIG. 1 shows a geodetic measuring instrument having a laser collimator built-in in its vertical axis.

FIG. 1 shows a theodolite 7, which is fastened by means of a conventional tribrach 8 on a tripod 9. The measuring instrument 7 has a telescope 11, a plate bubble and a centrally arranged sighting device 12 having a laser collimator 5 and laser beam generator 23. The laser collimator 5 is arranged centered in the vertical axis 4 of the measuring instrument 7, a distance measuring instrument 19 also being provided here.

The tribrach s has three (only two are represented in FIG. adjusting screws 14, arranged between two plates 15, 16, for vertical alignment of the measuring instrument 7.

For receiving the tribrach s together with the measuring instrument 7, the tripod 9 is equipped with tripod legs 17 and a supporting plate 10 and is set up over a defined ground mark z, for example a boundary stone 18 shown here. The distance between the relative height of the sighting line 13 of the telescope ii and the ground mark 2 is indicated by the arrow 6. The plates 15, 16 of the tribrach and the supporting plate 10 of the stand 9 each have a central opening 21 as passage for the light beam 1. The built-in distance measuring device 19 is assigned an interface 20 for data transmission.

Figure 2:
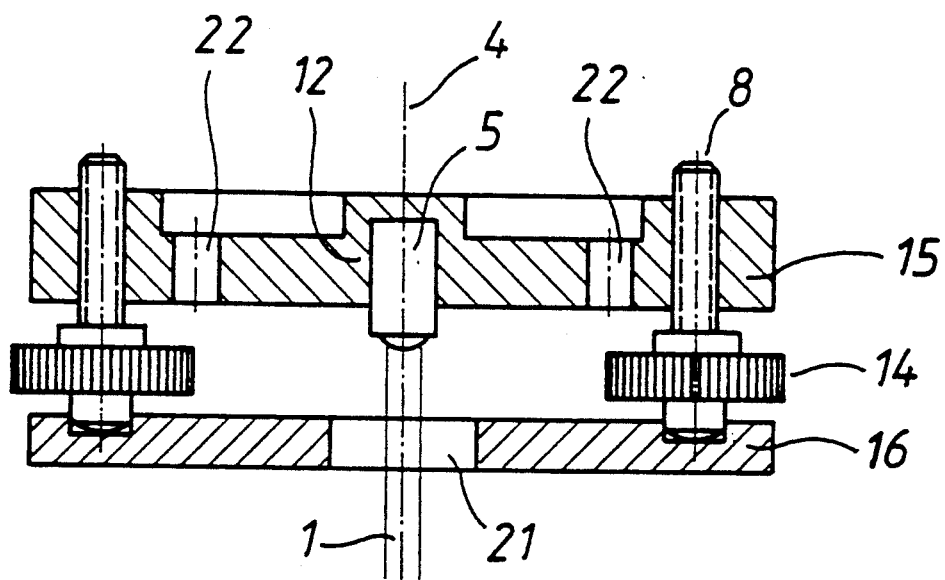
FIG. 2 shows a tribrach for receiving a geodetic instrument having a centrally built-in collimator.

FIG. 2 shows the geodetic tribrach 8 represented in FIG. 1, with the sighting device 12 and the built-in laser collimator 5. The tribrach 8 is here additionally equipped with centering bushes 22, so that all geodetic instruments can be inserted into this tribrach s in a forcibly centered manner by means of corresponding centering pins, that is to say even sighting targets, reflectors or the like. Consequently, instruments without their own optical sighting device can also be aligned over such ground marks 2.

The device according to the invention and the procedure of aligning a geodetic measuring instrument are to be explained with reference to FIG. 1.

First of all, the tripod 9 is positioned roughly over the ground mark 2 and the tribrach 8 as well as the measuring instrument 7 are fitted on the tripod 17. By means of the adjusting screws 14, the measuring instrument 7 is vertically aligned. The plate bubble 3 serves as an indicating means for this. After this vertical alignment, the laser collimator 5 and laser generator 23 are switched on and the laser beam 1 is projected onto the ground mark 2.

After loosening the fastening screw (not included in the representation of FIG. 1), the tribrach can be displaced freely over the ground mark 2 together with the measuring instrument 7 on the plate 10 of the tripod 9. After exact alignment of the laser beam 1 with the ground mark 2, the entire unit is fixed again by means of the fastening screw already mentioned.

Once this centering of the geodetic instrument 7 has been carried out, the distance measuring device 19 is switched on, and the laser beam 1 is modulated for distance measurement. The distance 6 between the ground mark 2 and the sighting line 13 of the telescope 11 can be determined from the signal of the reflected laser beam 1. The distance can, for example, be read off from an indicating device (not included in the representation) or the data are transmitted via an interface 20 to an external or internal computer.

The transmission of data can take place via a connecting cable, a wireless medium such as radio or by any other suitable means of data transmission.

The invention has succeeded in simplifying the centering of geodetic instruments over a ground mark and at the same time in ensuring that work can be carried out even during low light conditions such as twilight or at night, it being possible to also use the projected light beam for a distance measurement between the ground mark and the relative height of the sighting line.

What is claimed is:

1. A device for centering a geodetic instrument over a defined mark which lies in the extension of the vertical axis of said instrument and for measuring the distance between said mark and the sighting line of said instrument comprising:

an optical sighting device arranged centrally with respect to said vertical axis of said instrument;

means for generating a visible, collimated laser beam and for projecting said beam onto said mark including a light-emitting unit, disposed to be rotatable together with said instrument about said instrument vertical axis so that said mark lies in the extension of said vertical axis of said geodetic instrument; and, a distance measuring device including means for modulating said beam and for analyzing the light reflected from said mark to determine the distance between said mark and the sighting line of said geodetic instrument.

2. The device as in claim 1, further comprising a sighting device mounted upon a tribrach.

3. The device as in claim 1, wherein said sighting device comprises an interface for transmitting data to a central data acquisition unit.

4. A method for centering a geodetic instrument over a defined mark which lies in an extension of a vertical axis of said instrument and for measuring the distance between said mark and the sighting line of said instrument comprising the steps of:

providing an optical sighting device arranged centrally with respect to said vertical axis of said instrument;

generating a visible, collimated laser beam;

positioning said instrument so that said mark lies in the extension of the vertical axis of said instrument;

projecting said beam onto said mark;

providing a light-emitting unit, disposed to be rotatable together with said instrument about said instrument vertical axis, said light-emitting unit being connected to said means for generating and said means for projecting said laser beam;

measuring the distance between said mark and the sighting line of said geodetic instrument by modulating said beam and analyzing the light reflected from said mark to determine the distance between said mark and the sighting line of said geodetic instrument.

5. The method of claim 4, further comprising the step of providing a sighting device mounted upon a tribrach.

6. The method of claim 4, further comprising the step of transmitting data to a central data acquisition unit.

7. The method of claim 6, further comprising the step of providing an interface for transmitting said data.

* * * * *